(12) United States Patent
Pearson et al.

(10) Patent No.: US 11,157,481 B2
(45) Date of Patent: Oct. 26, 2021

(54) METHOD AND SYSTEM FOR PERFORMING COMPUTATIONS IN A DISTRIBUTED SYSTEM

(71) Applicant: Anaplan, Inc., San Francisco, CA (US)

(72) Inventors: George Duncan Pearson, York (GB); Jason S. Reich, York (GB)

(73) Assignee: Anaplan, Inc., San Francisco, CA (US)

( * ) Notice: Subject to any disclaimer, the term of this patent is extended or adjusted under 35 U.S.C. 154(b) by 203 days.

(21) Appl. No.: 16/453,998

(22) Filed: Jun. 26, 2019

(65) Prior Publication Data

US 2020/0409930 A1 Dec. 31, 2020

(51) Int. Cl.
*G06F 7/00* (2006.01)
*G06F 16/23* (2019.01)

(52) U.S. Cl.
CPC .................. *G06F 16/2365* (2019.01)

(58) Field of Classification Search
CPC .................................................. G06F 16/2365
USPC ........................................ 707/600–899, 690
See application file for complete search history.

(56) References Cited

U.S. PATENT DOCUMENTS

| | | | |
|---|---|---|---|
| 5,926,822 A | 7/1999 | Garman | |
| 2014/0180653 A1* | 6/2014 | Belmans | A63F 13/35 703/2 |

FOREIGN PATENT DOCUMENTS

EP 2634745 B1 5/2017

OTHER PUBLICATIONS

Jing-Fan Tang et al, Toward spreadsheet-based data management in distributed enterprise environment, Toward spreadsheet-based data management in distributed enterprise environment, 2004, 4, 2004.

* cited by examiner

*Primary Examiner* — Isaac M Woo
(74) *Attorney, Agent, or Firm* — Chamberlain, Hrdlicka, White, Williams & Aughtry

(57) ABSTRACT

A data management system includes a first consistency zone, a second consistency zone, and a repository manager. The repository manager identifies a calculation event for a derived object of the second consistency zone, the derived object includes a cross-zone reference to the first consistency zone; and in response to identifying the calculation event: identifies an object in the first consistency zone associated with the cross-zone reference; sends a remote object request, to the first consistency zone, for the object with reference to an event of the first consistency zone specified by the cross-zone reference; obtains the object after sending the remote object request; and obtains a derived object instance based, at least in part, on a computation specification of the derived object and the object.

14 Claims, 11 Drawing Sheets

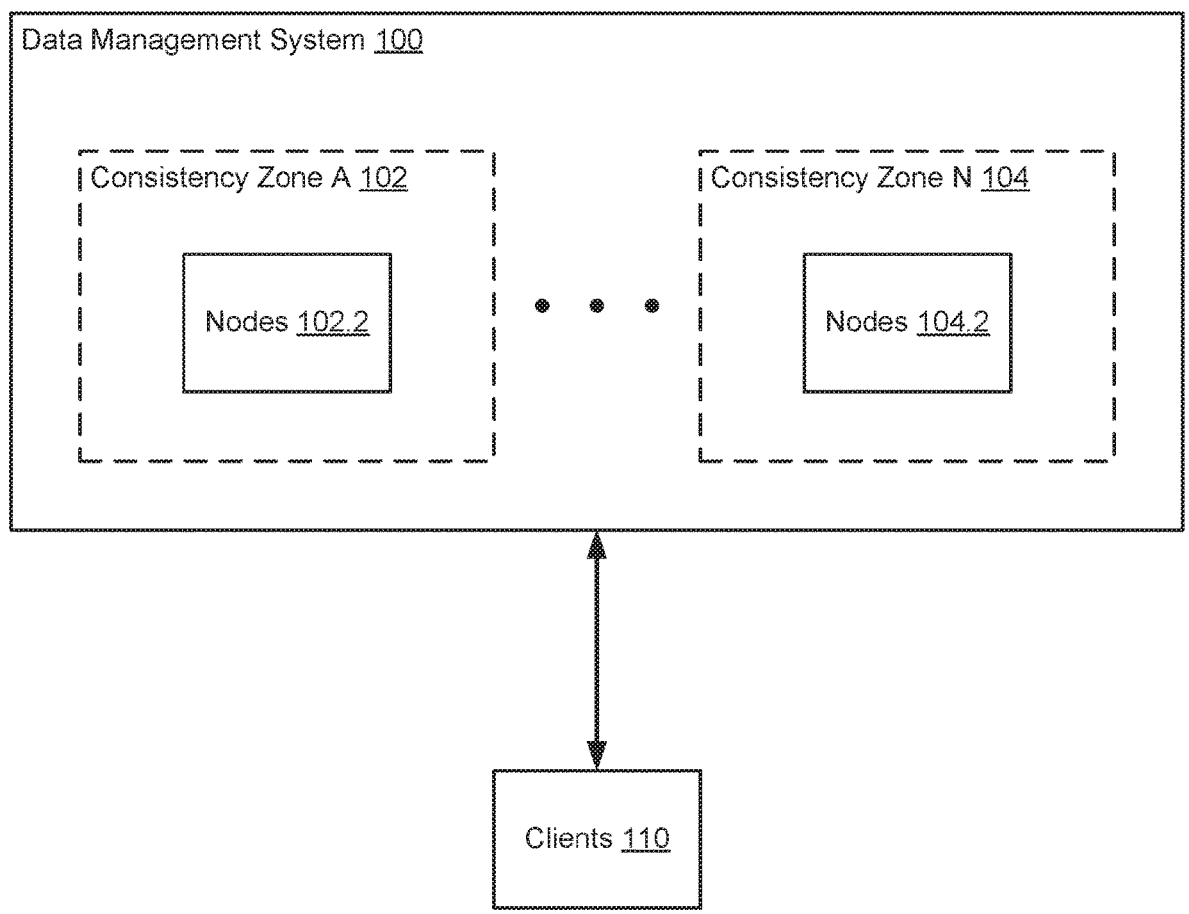
FIG. 1.1

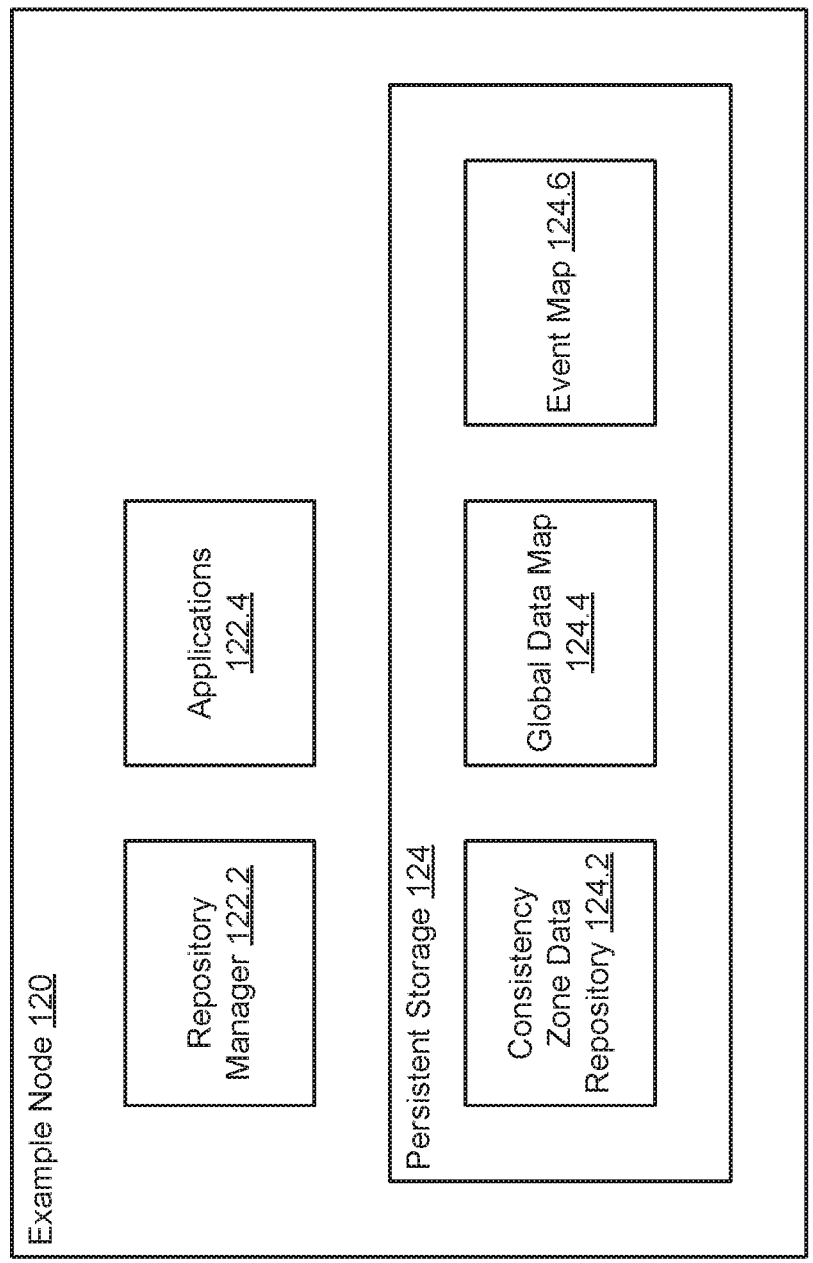
FIG. 1.2

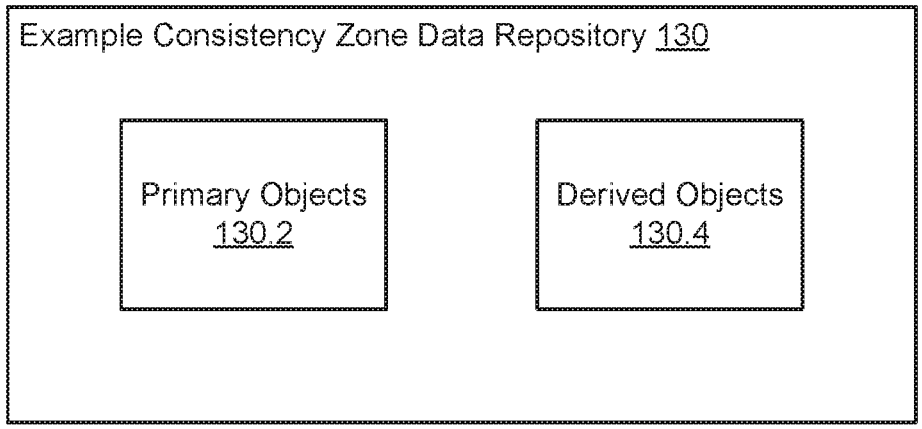
FIG. 1.3
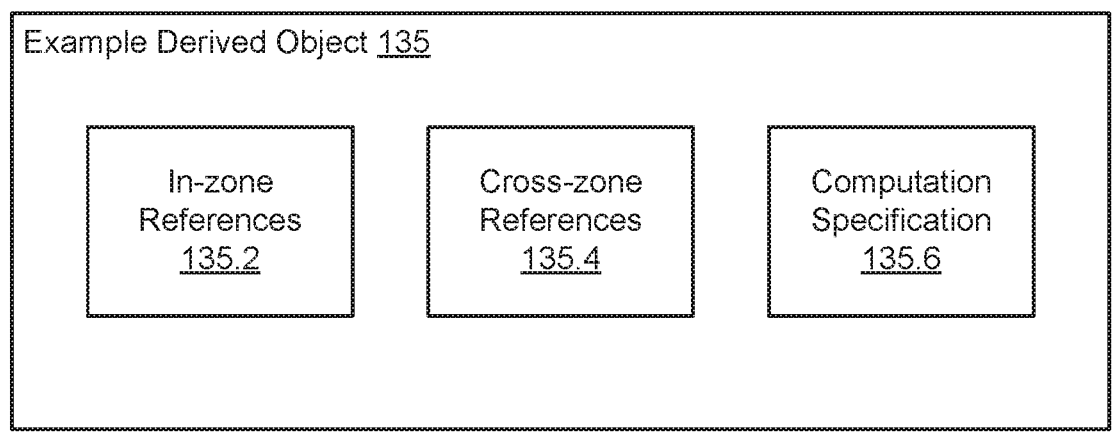
FIG. 1.4
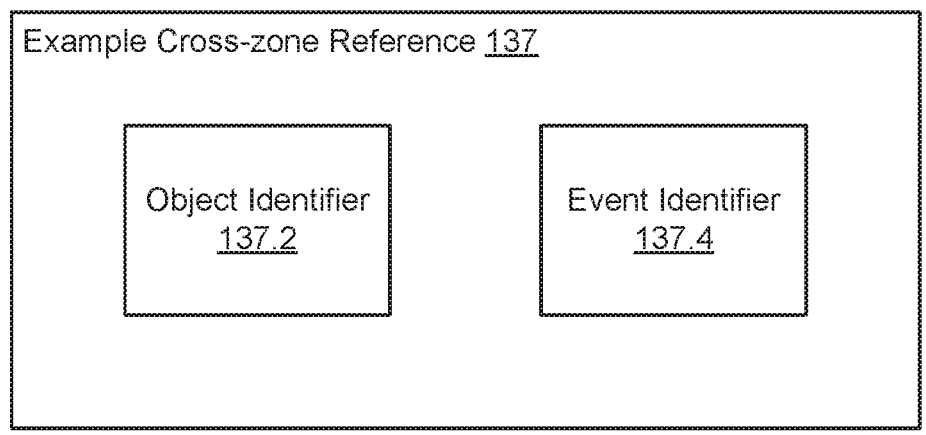
FIG. 1.5

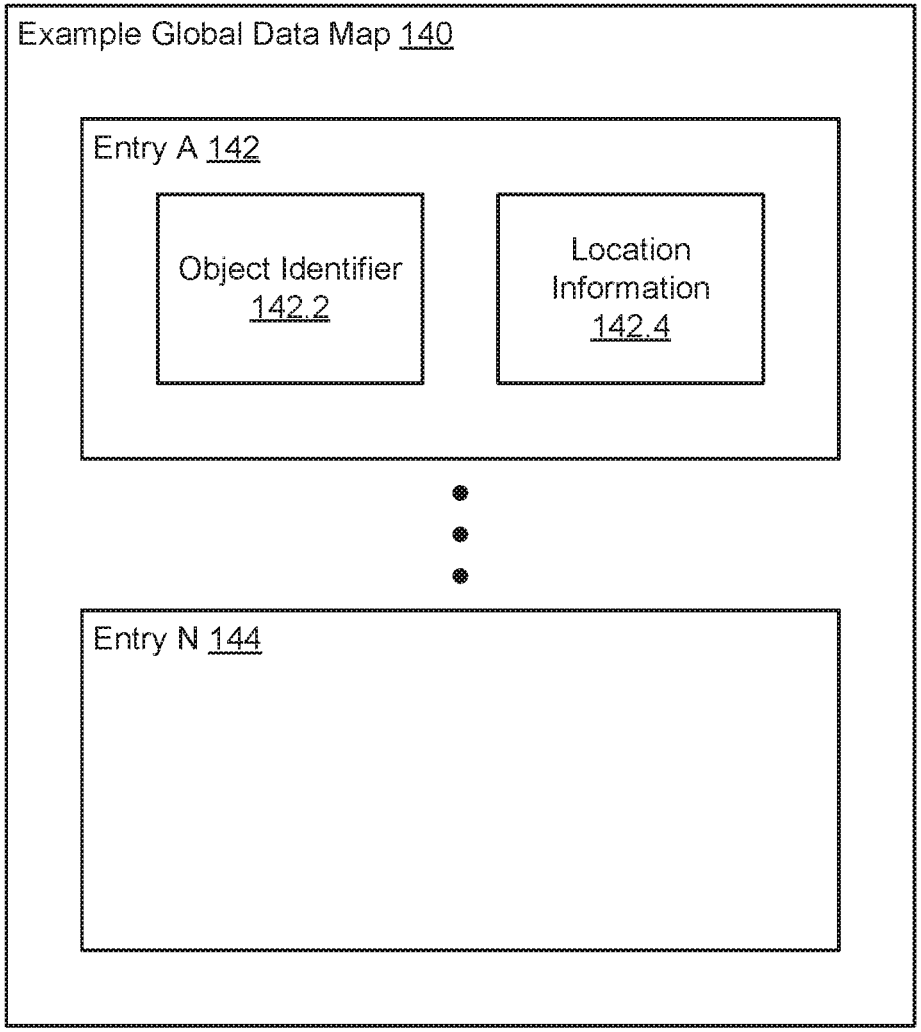
FIG. 1.6

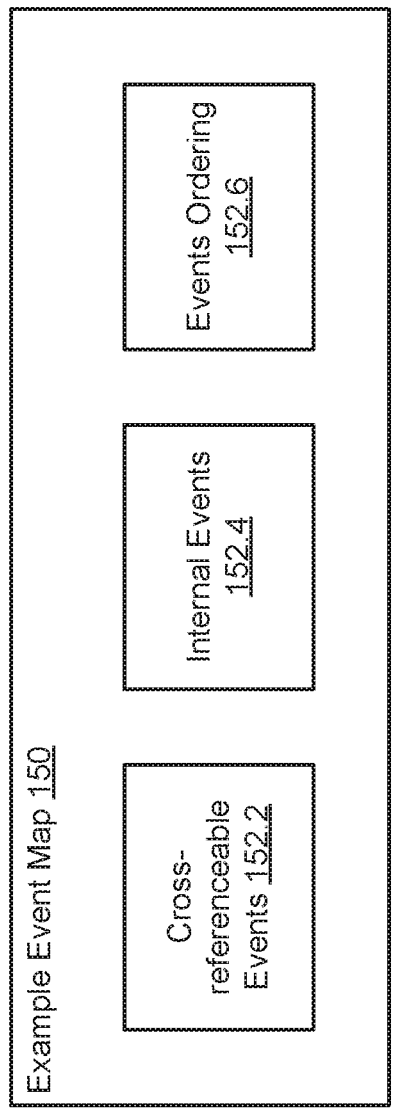
FIG. 1.7

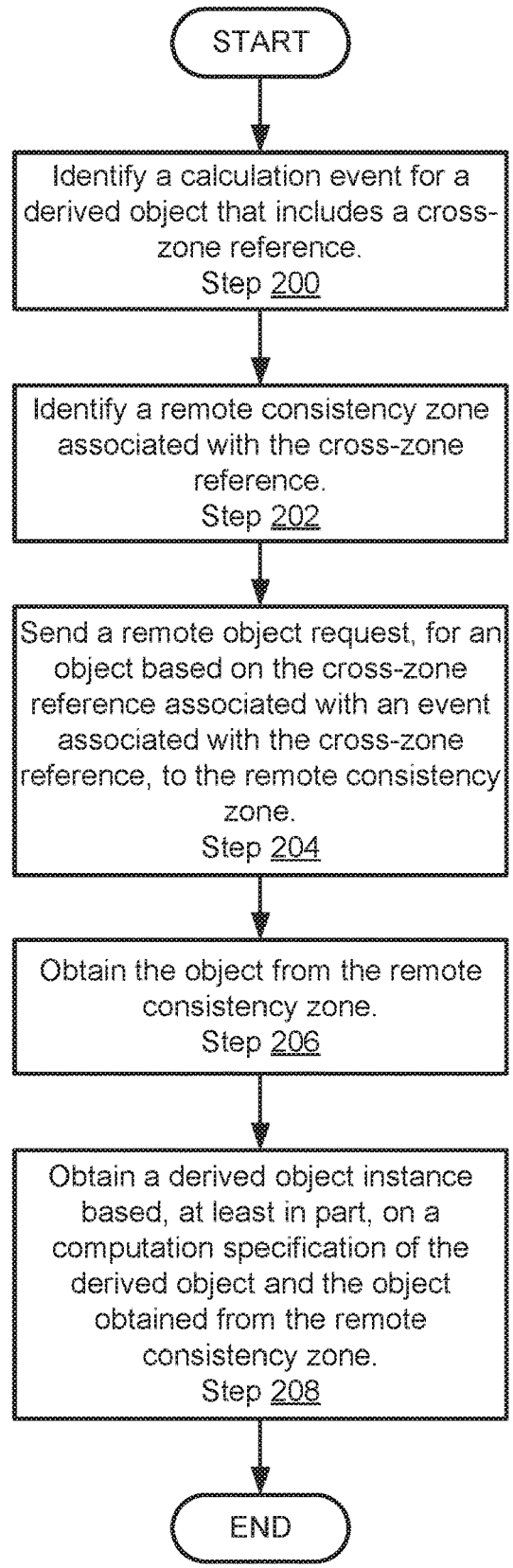
FIG. 2.1

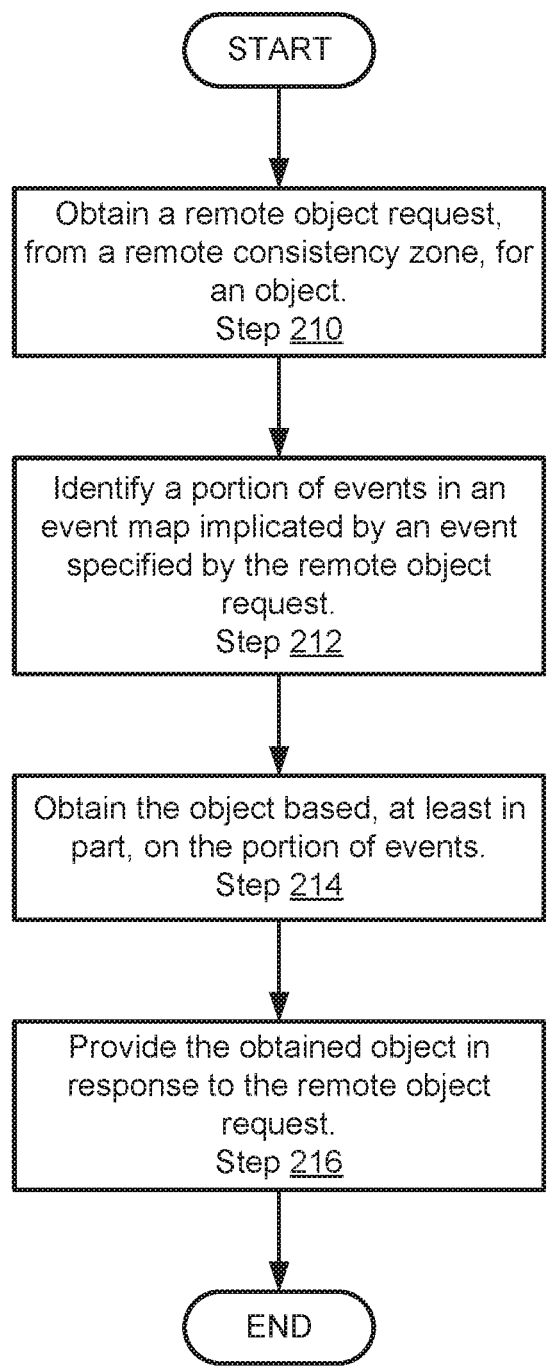
FIG. 2.2

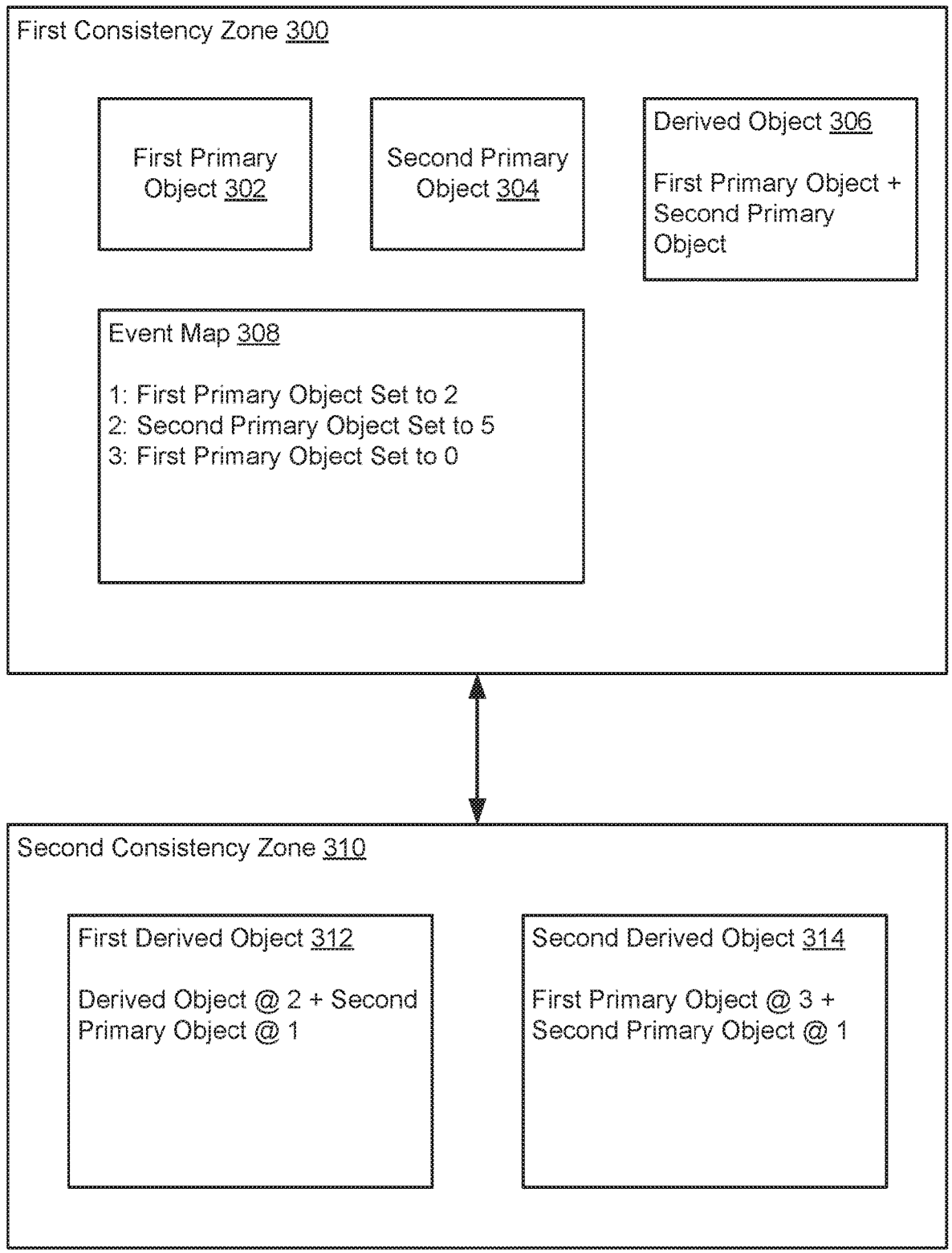
FIG. 3.1

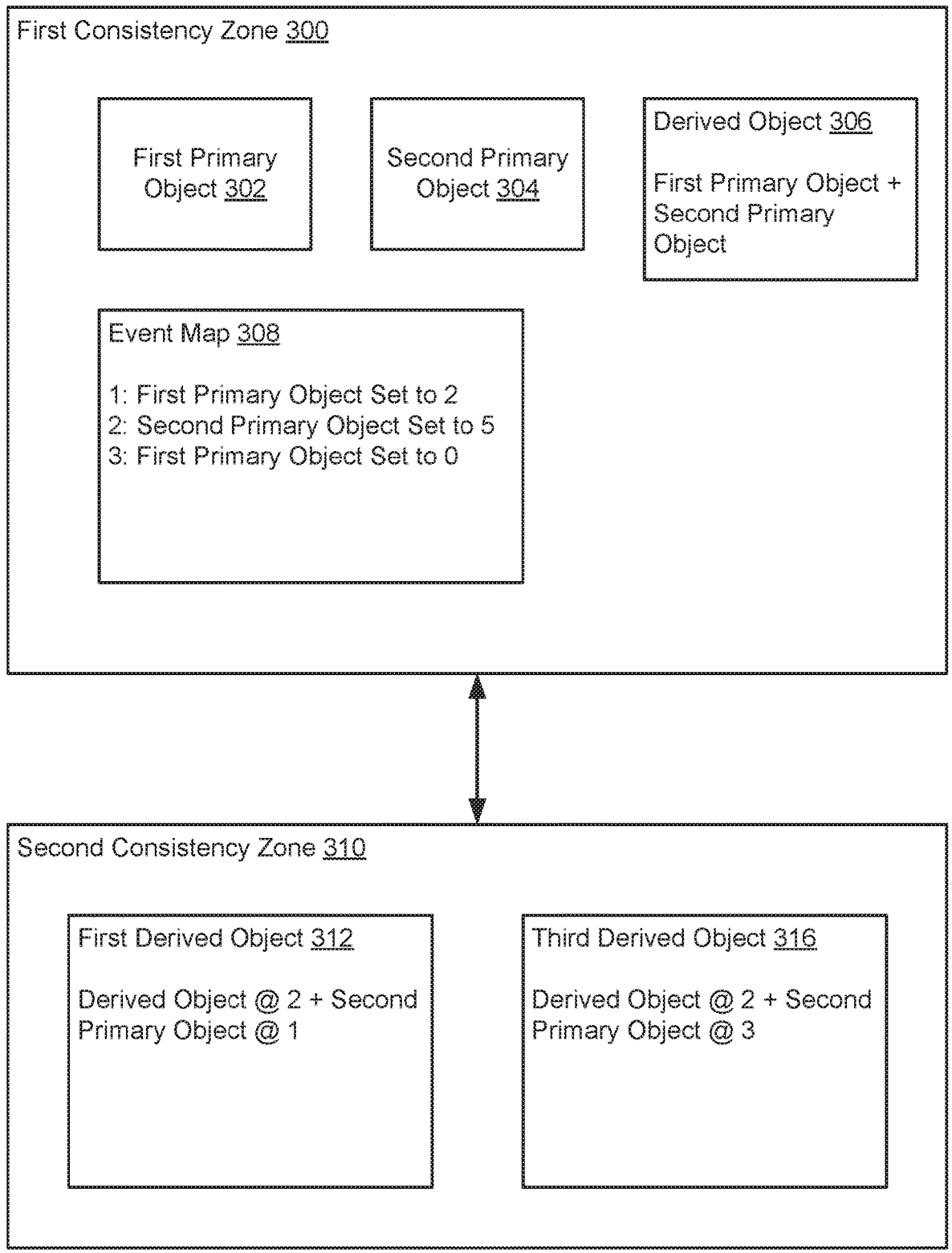
FIG. 3.2

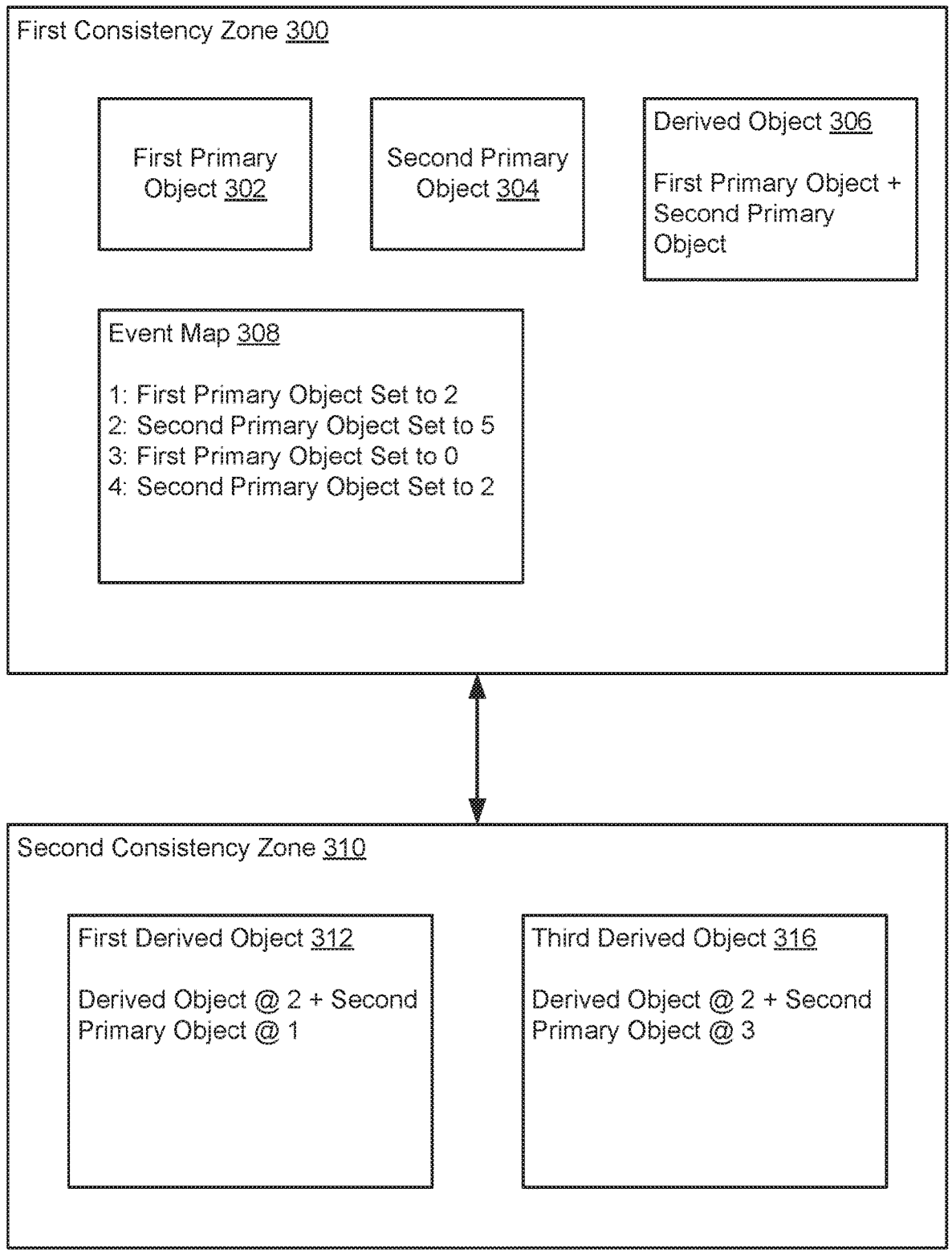
FIG. 3.3

METHOD AND SYSTEM FOR PERFORMING COMPUTATIONS IN A DISTRIBUTED SYSTEM

BACKGROUND

Distributed systems process data to provide desired functionality to users of the distributed system. The data may include any type and quantity of data. Processing the data consumes computing resources. Computing devices may have a limited quantity, of computing resources such as processing cycles, memory capacity, and storage capacity.

SUMMARY

In one aspect, a data management system in accordance with one or more embodiments of the invention includes a first consistency zone; a second consistency zone; and a repository manager that identifies a calculation event for a derived object of the second consistency zone; the derived object includes a cross-zone reference to the first consistency zone; in response to identifying the calculation event: identifies an object in the first consistency zone associated with the cross-zone reference; sends a remote object request, to the first consistency zone, for the object with reference to an event of the first consistency zone specified by the cross-zone reference; obtains the object after sending the remote object request; and obtains a derived object instance based, at least in part, on a computation specification of the derived object and the object.

In one aspect, a method for processing data in a data management system that includes a first consistency zone and a second consistency zone in accordance with one or more embodiments of the invention includes identifying a calculation event for a derived object of the second consistency zone, the derived object including a cross-zone reference to the first consistency zone; in response to identifying the calculation event: identifying an object in the first consistency zone associated with the cross-zone reference; sending a remote object request, to the first consistency zone, for the object with reference to an event of the first consistency zone specified by the cross-zone reference; obtaining the object after sending the remote object request; and obtaining a derived object instance based, at least in part, on a computation specification of the derived object and the object.

In one aspect, a non-transitory computer readable medium in accordance with one or more embodiments of the invention includes computer readable program code, which when executed by a computer processor enables the computer processor to perform a method for processing data in a data management system that includes a first consistency zone and a second consistency zone, the method includes identifying a calculation event for a derived object of the second consistency zone, the derived object including a cross-zone reference to the first consistency zone; in response to identifying the calculation event: identifying an object in the first consistency zone associated with the cross-zone reference; sending a remote object request, to the first consistency zone, for the object with reference to an event of the first consistency zone specified by the cross-zone reference; obtaining the object after sending the remote object request; and obtaining a derived object instance based, at least in part, on a computation specification of the derived object and the object.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example node in accordance with one or more embodiments of the invention.

FIG. 1.3 shows a diagram of an example consistency zone data repository in accordance with one or more embodiments of the invention.

FIG. 1.4 shows a diagram of an example derived object in accordance with one or more embodiments of the invention.

FIG. 1.5 shows a diagram of an example cross-zone reference in accordance with one or more embodiments of the invention, FIG. 1.6 shows a diagram of an example global data map in accordance with one or more embodiments of the invention.

FIG. 1.7 shows a diagram of an example event map in accordance with one or more embodiments of the invention.

FIG. 2.1 shows a flowchart of obtaining a derived object instance in accordance with one or more embodiments of the invention.

FIG. 2.2 shows a flowchart of a method of providing an object in accordance with one or more embodiments of the invention.

FIG. 3.1 shows a diagram of an example system at a first point in time.

FIG. 3.2 shows a diagram of the example system the system of FIG. 3.1 at a second point in time.

FIG. 3.3 shows a diagram of the example system the system of FIG. 3.1 at a third point in time.

DETAILED DESCRIPTION

Figure 4:
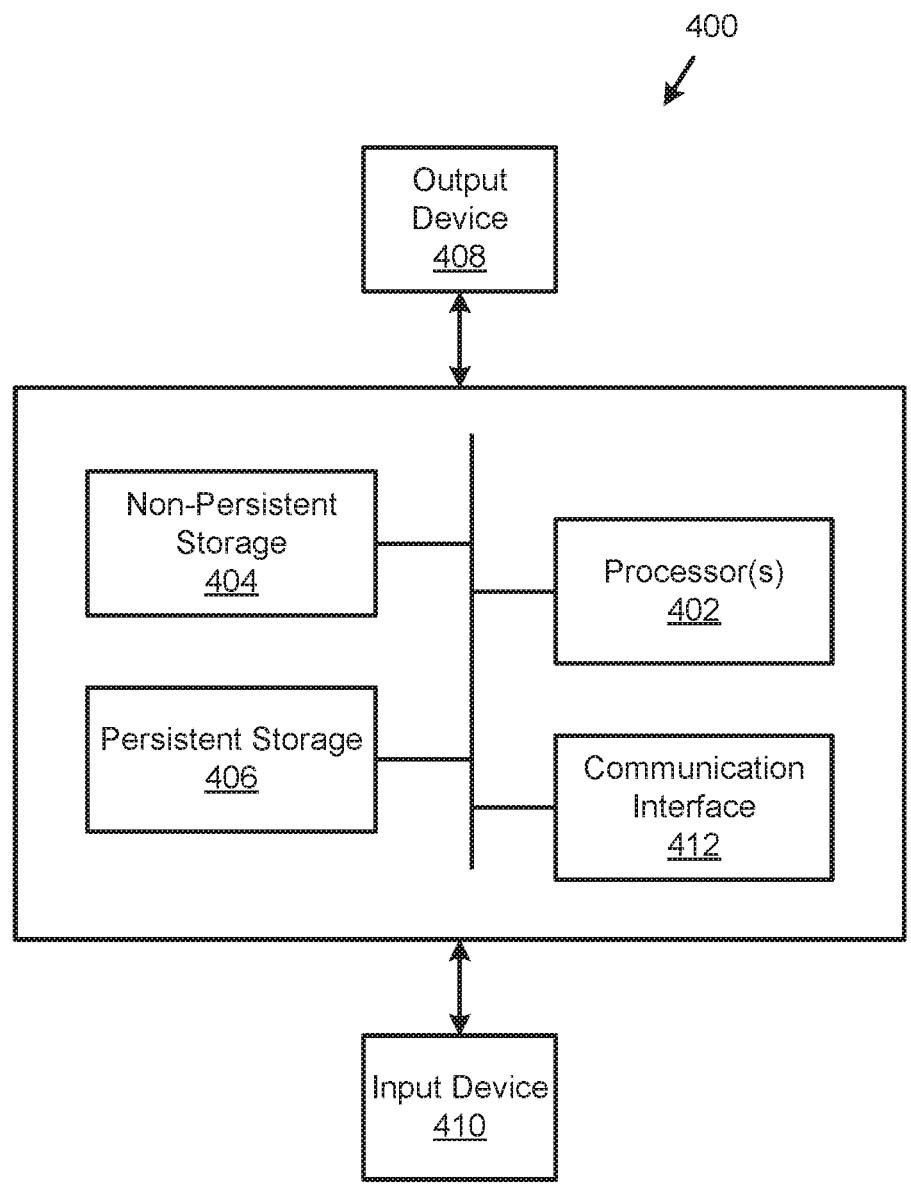
FIG. 4 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data in a distributed system. Specifically, a system in accordance with one or more embodiments of the invention may include multiple zones that are time independent from each another. By doing so, the computational cost for calculations within each of the zones may be reduced because all of the zones are not impacted by all events that occur throughout the distributed system.

In one or more embodiments of the invention, the data management system provides mechanisms for enforcing consistency across multiple zones that are time independent from each another. The data management system may enforce consistency, across-zones by referencing events that are relevant to a respective zone when requesting data from that zone. By doing so, the results of such requests may be consistent with other results from such requests at different points in time with respect to the requesting system.

FIG. 1.1 shows a data management system (100) in accordance with one or more embodiments of the invention. The data management system (100) may provide computer implemented services to clients (110). The computer implemented services may include, for example, data storage, data processing, and/or other types of computer implemented services.

To provide computer implemented services to the clients (110), the data management system (100) may include any number of consistency zones (e.g., 102, 104). A consistency zone may be a logical grouping of data that is temporally related. Some portions of data of the consistency zone may be publically accessible while other portions of the data of the consistency zone may have access restrictions, i.e., may not be publicly accessible, based on whether the data represents an intermediate effect rather than a final result that is publicly accessible. The access restrictions may only applied to entities that are external to a consistency zone, e.g., an entity that is a member of another consistency zone.

The data of each consistency zone may be stored and managed used computing resources of the data management system (100) separately from data of other consistency zones. By doing so, the computing resources cost for managing the data stored in the data management system may be reduced when compared to systems that attempt to manage data in aggregate rather than in separate consistency zones. For example, the computational cost of perform a calculation on a single consistency zone may be substantially smaller rather than performing the calculation on all of the data of the data management system (100).

The components of the system illustrated in FIG. 1.1 may be operably connected to each other and/or other entities (not shown) via any combination of wired and/or wireless networks. Each component of the system illustrated in FIG. 1,1 is discussed below.

The clients (110) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc). The persistent storage may store computer instructions, e.g., computer code, that when executed by the processor(s) of the computing device cause the computing device to perform the functions of the clients (110) described in this application and/or all, or portion, of the methods illustrated in FIGS. 2.1-2.2, The clients (110) may be other types of computing devices without departing from the invention. For additional details regarding computing devices, refer to FIG. 4.

The clients (110) may be logical devices without departing from the invention. For example, the clients (110) may be virtual machines that utilize computing resources of any number of physical computing devices to provide the functionality of the clients (110).

In one or more embodiments of the invention, the clients (140) utilize computer implemented services provided by the data management system (100). For example, the clients (110) may store data in the data management system (100), retrieve data from the data management system (100), instruct the data management system (100) to derive new data from data already stored in the data management system (100) and/or other locations, and/or obtain other types of computer implemented services from the data management system (100).

As noted above, a consistency zone (e.g., 102, 104) may be a logical grouping of data. Different consistency zones may be tasked with managing different and/or similar (i.e., duplicative copies) data.

In one or more embodiments of the invention, each consistency zone (e.g., 102, 104) utilizes computing resources of one or more nodes (102.2, 104.2). Consistency, zones may utilize the computing resources of the same or different nodes. Nodes may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the nodes (102.2, 104.2) described in this application and/or all, or portion, of the methods illustrated in FIGS. 2.1-2.2. The nodes (102.2, 104.2) may be other types of computing devices without departing from the invention. For additional details regarding computing devices, refer to FIG. 4.

The nodes (102.2, 104.2) may be logical devices without departing from the invention. For example, the nodes (102.2, 104.2) may be virtual machines that utilize computing resources of any number of physical computing devices to provide the functionality of the nodes (102.2, 104.2). For additional details regarding nodes, refer to FIG. 1.2.

In one or more embodiments of the invention, the nodes utilized by each consistency zone cooperatively provide the functionality of the consistency zone. In other words, the nodes of the consistency zone may form a distributed system that provides the functionality of the consistency zone. While the consistency zones (102, 104) are illustrated in FIG. 1.1 as utilizing different nodes, different consistency zones may utilize a partially or completely overlapping group of nodes. In other words, consistency zones may split the use of computing resources of nodes. For example, a single node may be utilized by two consistency zones to provide the functionality of each respective consistency zone.

In one or more embodiments of the invention, each consistency zone (e.g., 102, 104) provides data management services for a portion of the data of the data management system (100) stored in the computing resources, e.g., the nodes, of the consistency zone. The data management services may include: (i) storing of data in computing resources of the consistency zone, (ii) providing copies of stored data from computing resources of the consistency zone, and/or (iii) generating/storing new data based on stored data in computing resources of the consistency zone. By doing so, embodiments of the invention may provide data management services more efficiently, than contemporary methods of providing data management services.

To provide data management services, each consistency zone (e.g., 102, 104) may include functionality to service queries. A query may be a request to store, provide, and/or generate data. Servicing a query may generate a query result. A query may provide other data management service functionality without departing from the invention.

In one or more embodiments of the invention, each consistency zone includes functionality to service queries that reference data stored in the consistency zone and in other consistency zones. For example, consistency zone A (102) may service a query that requests generation of new data based on data stored in the nodes (102.2) of consistency zone A (102) and data stored in the nodes (104.2) of consistency zone N (104). To do so, a cross-zone reference may be utilized. For additional details regarding generation of new data using cross-zone references, refer to FIGS. 1.4-1.5.

In one or more embodiments of the invention, each consistency zone may have a time basis that is independent from other consistency zones. That is, events that occur in one consistency zone may not have any relation to events that occur in other consistency zones. To keep track of the time basis in each consistency zone, an event log or other types of data structure may be utilized. The event log may keep track of all events occur in each consistency zone. An even may be, for example, the generation of data within a consistency zone. Accordingly, the states of data in each consistency zone may be associated only with events that occur in that consistency zone and may only be ordered with respect to the events that occur in that consistency zone.

In one or more embodiments of the invention, each consistency zone may include just-in-time calculation functionality. Just-in-time calculation functionality may delay performance of calculations until the results of the calculations are needed. For example, consider a scenario in which a consistency zone is required to service a query that generates new data based on existing data. Rather than generating the result of the query immediately, the consistency zone may delay generating the result of the query until the result is needed by the requesting entity or another entity. By doing so, changes to data over time that is referenced by the query may not trigger regeneration of the query for each change in the data. Consequently, the computational load for queries being serviced by each consistency zone may be greatly reduced.

While the system of FIG. 1.1 has been described and illustrated as including a limited number of components for the sake of brevity, a system in accordance with embodiments of the invention may include additional, fewer, and/or different components than those illustrated in FIG. 1.1 without departing from the invention.

As discussed above, nodes utilized by a consistency zone may cooperatively provide the functionality of the consistency zone. FIG. 1.2 shows a diagram of an example node (120) in accordance with one or more embodiments of the invention.

The example node (120) may cooperatively provide data management services with other nodes of the consistency zone. To provide this functionality, the example node (120) may include a repository manager (122.2), applications (122.4), and persistent storage (124). Each component of the example node (120) is discussed below.

The repository manager (122.2) may manage data stored in the consistency zone data repository (124.2). To do so, repository manager (122.2) may provide query service functionality in conjunction with other repository managers hosted by other nodes utilized by the consistency zone. As discussed above, the query service functionality may cause data to be stored in the consistency zone data repository (124.2), provide data that is already stored in the consistency zone data repository (124.2), and/or generate new data based on data already stored in the consistency zone data repository (124.2) and/or other data sources.

When servicing queries, the repository manager (122.2) may utilize the global data map (124.4) and/or the event map (124.6). For example, the repository manager (122.2) may identify where particular data of the consistency zone is stored within a consistency zone (e.g., where the data is stored in computing resources of nodes that support the consistency zone) using the global data map (124.4).

In one or more embodiments of the invention, the repository manager (122.2) is a hardware device including circuitry. The repository manager (122.2) may be, for example, a digital signal processor, a field programmable gate array, or an application specific integrated circuit. The repository manager (122.2) may be other types of hardware devices without departing from the invention.

In one or more embodiments of the invention, the repository manager (122.2) is implemented as computing code stored on a persistent storage that when executed by a processor performs the functionality of the repository manager (122.2). The processor may be a hardware processor including circuitry such as, for example, a central processing unit or a microcontroller. The processor may be other types of hardware devices for processing digital information without departing from the invention.

To provide the above noted functionality of the repository manager (122.2), the repository manager (122.2) may perform all, or a portion, of the methods illustrated in FIGS. 2.1-2.2.

The applications (122.4) may provide computer implemented services to clients. The computer implemented services may include any type of service without departing from the invention. The example node (120) may host any number of applications (122.4).

In one or more embodiments of the invention, the applications (122.4) provide modeling services based on data stored in the consistency zone data repository (124.2). For example, the applications (122.4) may generate predictions based on data stored in the consistency zone data is repository (124.2).

In one or more embodiments of the invention, the applications (122.4) provide modeling support services. The modeling support services may provide subsets of the data in the consistency zone data repository (124.2) that is relevant to a particular modeling task. Modeling software hosted by a client may use the subset of the data to generate a prediction or may use the subset of the data for other purposes.

In one or more embodiments of the invention, the applications (122.4) are implemented as computing code stored on a persistent storage that when executed by a processor performs the functionality of the applications (122.4). The processor may be a hardware processor including circuitry such as, for example, a central processing unit or a microcontroller. The processor may be other types of hardware devices for processing digital information without departing from the invention.

To provide the above noted functionality of the applications (122.4), the applications (122.4) may perform all, or a portion, of the methods illustrated in FIGS. 2.1-2.2.

In one or more embodiments of the invention, the persistent storage (114) is a data storage device. For example, the persistent storage (114) may be any combination of hard disk drives, solid state disk drives, tape drives, and/or any other physical storage medium for the storage of data. The persistent storage (114) a be a logical storage, e.g., virtual drive, without departing from the invention.

In one or more embodiments of the invention, the persistent storage (114) stores a consistency zone data repository (124.2), a global data map (124.4), and an event map (124.6). Each of these data structures is described below.

In one or more embodiments of the invention, the consistency zone data repository (124.2) is a data structure that includes a portion of the data of the consistency zone. Each node of the consistency zone may store a portion of the data of the consistency zone. In other words, the data of the consistency zone may span across any number of nodes. For additional details regarding the consistency zone data repository (124.2), refer to FIG. 1.3.

In one or more embodiments of the invention, the global data map (124.4) is a data structure that includes location information regarding all of the data managed by a data management system. The location information may enable the repository manager (122.2) to retrieve any data from any consistency zone of a data management system. For additional details regarding global data maps, refer to FIG. 1.6.

In one or more embodiments of the invention, the event map (124.6) is a data structure that includes information regarding the occurrence of each event in a consistency zone. As noted above, the repository manager (122.2) may be a just-in-time system. Accordingly, the state of data of a consistency zone is relative to events that have occurred in the consistency zone.

For example, as data is modified over time the results of new data that is derived from the data may also change over time. Thus, when data is requested from the consistency zone, it is requested with respect to a particular event that has occurred in the consistency zone so that it can be appropriately generated at the time the requested is needed. For additional details regarding the event map, refer to FIG. 1.7.

While the persistent storage (1124) has been illustrated as including a limited number of data structures that are stored in a specific format, the persistent storage (124) may include additional, different, and/or less data from that illustrated in FIG. 1.2 without departing from the invention. Additionally, while the data structures illustrated in FIG. 1.2 are illustrated as being separate them other types of data, these data structures may be integrated into other data structures; include additional, different, and/or less data the described above; and/or may be subdivided into any number of data structures without departing from the invention. Further, while the data structures illustrated in FIG. 1.2 are shown as being stored in a persistent storage of the example node (120), these data structures may be stored in other locations (e.g., remote), spanned across any number of computing devices, and/or shared with any number of other entities without departing from the invention.

To further clarify aspects of embodiments of the invention, diagrams of data structures in accordance with embodiments of the invention are illustrated in FIGS. 1.3-1.7.

FIG. 1.3 shows a diagram of an example consistency zone data repository (130) in accordance with one or more embodiments of the invention. As noted above, the consistency zone data repository (130) may store portion of the data of a consistency zone.

The example consistency zone data repository (130) may include primary objects (130.2) and derived objects (130.4). Primary objects (130.2) may be independent objects. That is, the content of primary objects (130.2) may not depend on the content of any other object. For example, when the client requests to store data in the example consistency zone data repository (130), the data may be stored as one or more primary objects (130.2).

The derived objects (130.4) may be a data structure having a content that is based on the content of one or more primary objects (130.2) and/or other derived objects (130.4). The derived object may include information necessary to obtain the content of the derived object. When the content of the derived object is computed, it may be referred to as a derived object instance.

To further clarify derived objects, a diagram of an example derived object (135) in accordance with one or more embodiments of the invention is shown in FIG. 1.4. As noted above, derived objects may include information necessary to obtain the content of the derived object.

The example derived object (135) may include one or more in-zone references (135.2), one or more cross-zone references (135.4), and the computation specification (135.6). The in-zone references (135.2) may include information that enables the content of primary objects and/or derived objects in the consistency zone in which the example derived object (135) resides to be obtained. For example, the in-zone references (135.2) may be identifiers of objects in the consistency zone. The in-zone references (135.2) may be other types of information for identifying objects within a consistency zone hosting the example derived object (135) without departing from the invention The computation specification (135.6) may include information that enables a computation to be performed using the content of the objects referenced by the in-zone references (135.2) and/or the cross-zone references (135.4), For example, the computation specification (135.6) may be a reference to a particular type of query supported by a repository manager (e.g., 122.2, FIG. 1.2) of a node. The computation specification (135.6) may be other types of information that specifies a computation to be performed without departing from the invention.

The cross-zone references (135.4) may include information that enables the content of primary objects and/or derived objects in other consistency zones in which the example derived object (135) does not reside to be obtained. For additional information regarding cross-zone references (135.4), refer to FIG. 1.5.

FIG. 1.5 shows a diagram of an example cross-zone reference (137) in accordance with one or more embodiments of the invention. As noted above, a cross-zone information may be a data structure that includes information that enables the content of an object in another consistency zone to be identified and/or obtained.

The example cross-zone reference (137) may include an object identifier (137.2) and/or an event identifier (137.4). The object identifier (137.2) may be a data structure including information that enables an object in another consistency zone to be identified. For example, the object identifier (137.2) may be the name of the object. The object identifier (137.2) may be obtained from a global data map (e.g., 124.4).

The event identifier (137.4) may be a data structure that includes information regarding an event that occurred in another consistency zone in which the object associated with the object identifier (137.2) resides. As discussed above, the state of data in a consistency zone may be relative only to the events that occurred in that consistency zone. Thus, the event identifier (137.4) may include information with respect to an event that is relevant to the consistency zone in which the object resides.

As discussed above, entities in consistency zones may need to access data stored in that consistency zone and in other consistency zones. FIG. 1.6 shows a diagram of an example global data map (140) in accordance with one or more embodiments of the invention. The example global data map (140) may be a data structure that includes information that enables the location of each object of the data management system to be identified and/or obtained.

The example global data map (140) may include any number of entries (e.g., 142, 144). Each of the entries may correspond to an object of the data management system. Each entry may include an object identifier (142.2) that enables an object associated with the entry to be identified. Each entry may also include location information (142.4) that enables a consistency zone in which the object associated with the entry resides to be identified. For example, the object identifier (142.2) may be the name or indexing information of the object and the location information (142.4) may be identifier of the consistency zone hosting the object associated with the entry. Object identifier (142.2) and the location information (142.4) may be other types of information that enable the object to be identified and the location of the object to be determined without departing from the invention.

As discussed above, consistency zones of data management system may include just-in-time processing functionality which causes the state of data in the data management system to be relative to events of each consistency zone. FIG. 1.7 shows a diagram of an example event map (150) in accordance with one or more embodiments of the invention.

The example event map (150) may be a data structure that includes information regarding the events that have occurred in a consistency zone associated with the example event map (150). The example event map (150) may include cross referenceable events (152.2), internal events (152.4), and an events ordering (152.6).

The cross referenceable events (152.2) may include any number of events that have occurred within a consistency zone that are referenceable by other consistency, zones. In other words, not all events that occur in the consistency zone may be referenceable by other consistency zone for purposes of derived objects. Each consistency zone may publish data that is referenceable by other consistency zones. By default, all data in a consistency zone may be considered to be not referenceable. Access to data that is not published may be restricted to other consistency zones.

For example, a consistency zone may publish the event that completes an employee list (if such data exists in the consistency zone), the last data before a forecast rollover or completes the description of a consistency zone's governance model. By doing so, other consistency zones may access the published data.

The internal events (152.4) may include any number of events that have occurred within the consistency zone that may not be referenced by other consistency zones. For example, a consistency zone may not wish to make available events that are intermediate works-in-progress (e.g., intermediate results of a calculation that will generate desirable data) on an object that will be considered completed later in a sequence of calculations necessary to complete the object. Only the events that complete a result may be published while all the results in a partially completed sequence may be kept internal, i.e., not published.

The events ordering (152.6) may specify an order of the cross-referenceable events (152.2) and the internal events (152.4). The order may be relative with respect to each of the events. For example, the ordering (152.6) may be a list of events of the cross-referenceable events (152.2) and the internal events (152.4) that occurred from first to last. The ordering (152.6) may be different types of data structures for specifying ordering other than lists without departing from the invention. Because each consistency zone is time independent from other consistency zones, the ordering of the events may only be with respect to other events of the consistency zone and not with respect to events that occurred in other consistency zones.

For example, a first event map of a first node of a first consistency zone may specify a first event and a second event map of a second node of a second consistency zone may specify a last event. The last event may have, in reality, occurred prior to the first event because the ordering of each of the event maps is unrelated to the ordering of other event maps.

As discussed above, consistency zones may provide data management services to clients. FIGS. 2.1-2.2 show methods that may be performed by components of the system of FIG. 1.1 to provide data management services in accordance with one or more embodiments of the invention. While illustrated in FIGS. 2.1-2.2 as a list of steps, the steps may be performed in a different order, steps may be omitted, additional steps may be performed, and/or some or all of the steps of FIGS. 2.1-2.2 may be performed in a parallel and/or partially overlapping manner without departing from the invention, FIG. 2.1 shows a flowchart of a method in accordance with one or more embodiments of the invention. The method depicted in FIG. 2.1 be used to obtain a derived object instance in accordance with one or more embodiments of the invention. The method shown in FIG. 2.1 may be performed by, for example, a node (e.g., 120, FIG. 1.2). Other components of the system illustrated in FIG. 1.1 may perform all, or a portion, of the method of FIG. 2.1 without departing from the invention.

In step 200, a calculation event for a derived object includes a cross-zone reference is identified.

In one or more embodiments of the invention, the calculation event is an event that immediately requires a derived object instance of the derived object. The calculation event may be, for example, performance of a query that utilizes the derived object instance, a request for the derived object instance from the user, and/or a request for the derived object instance from a modeling application.

In one or more embodiments of the invention, the derived object instance is an object that depends on the contents of one or more other objects.

In one or more embodiments of the invention, the cross-zone reference is a reference to an object of another consistency zone that is not impacted by the calculation event. For example, the calculation event may only impact a single consistency zone. The impacted consistency zone may need to generate the derived object instance in response to the calculation event.

In step 202, a remote consistency zone associated with the cross reference is identified. A remote consistency may be another consistency zone that does not include the derived object of step 200.

In one or more embodiments of the invention, the remote consistency zone is identified using a global data map. An identifier of an object specified by the cross-zone reference may be used as a key with respect to the global data map to obtain location information corresponding to the object specified by the cross-zone reference.

In step 204, a remote object request, for an object based on the cross-zone reference associated with an event associated with the cross-zone reference, is sent to the remote consistency zone.

In one or more embodiments of the invention, the remote object request is a request for an object of another consistency zone. The remote object request may be a data structure that includes information necessary to obtain the object of the another consistency zone specified by the remote object request.

For example, the cross-zone reference may specify an identifier of an object in another consistency zone and an event of the another consistency zone. The remote object request may include this information. Such information may be used by the another zone to provide data in response to the remote object request. For additional details with respect to responding to a remote object request, refer to FIG. 2.2.

In step 206, the object from the remote consistency zone is obtained.

In one or more embodiments of the invention, the object is obtained from the remote consistency zone by receiving a message from the remote consistency zone that includes the object.

In step 208, a derived object instance based, at least in part, on the computation specification of the derived object and the object obtained from the remote consistency zone is obtained.

In one or more embodiments of the invention, the derived object instance is obtained by generating the derived object instance by servicing a query using the computation specification. The object may be used as an input for the query and the query may perform the computation specification. The query may utilize additional inputs, other than the object, to generate the derived object instance.

For example, consider a scenario in which it is desirable determine a manufacturer's the total income generated by a product in a particular time period where sales figures are provided by a consistency zone representing each distributor and a products list, used by secondary consistency zones, is stored in a common consistency zone provided by the manufacturer. In such a scenario, it may be advantageous to generate a query in the consistency zone that includes references to the common consistency zone.

Further, consider a second scenario in which it may be desirable to extend the capabilities of the logic in a (original) consistency zone using a second consistency zone for "sandbox" purposes, i.e., generate a new model/data without disturbing modeling/data in the consistency zone. In this second scenario, queries may be generated in the second consistency zone that cross reference data included in the consistency zone. By doing so, new objects may be derived by the events recording extensions to the original logic of the consistency zone.

In one or more embodiments of the invention, the derived object instance is generated using a computation specification, in-zone references, and cross-zone references including the object specified in the derived object of Step 200. For example, the contents of objects specified by the in-zone and cross-zone references may, be used as input for a computation specified by the computation specification to obtain the derived object instance as the result of performing a computation specified by the computation specification.

While described with respect to generating the derived object stance by way of a query service, other computation frameworks may be utilized to generate the derived object instance without departing from the invention. For example, state machines or other digital logic systems may be used to generate the derived object instance.

The method may end following Step 208.

FIG. 2.2 shows a flowchart of a method in accordance with one or more embodiments of the invention. The method depicted in FIG. 2.1 be used to provide an object in accordance with one or more embodiments of the invention. The method shown in FIG. 2.2 may be performed by, for example, a node (e.g., 120, FIG. 1.2). Other components of the system illustrated in FIG. 1.1 may perform all, or a portion, of the method of FIG. 2.2 without departing from the invention.

In step 210, a remote object request, from a remote consistency zone, for an object is obtained.

The remote object request may include information that identifies (i) an object of the consistency zone that received the remote object request and (ii) a state of the object. The state of the object may be specified with respect to an event that occurred in the consistency zone that received the remote object request. For example, the remote object request may include an identifier of the object an identifier of the event that occurred in the consistency zone that includes the object.

In step 212, a portion of events in an event map implicated by the events specified by the remote object request is identified.

In one or more embodiments of the invention, the portion of the events include all of the events specified by the event map that occurred up to and including the event specified by the remote object request. The even map is that of the consistency zone that received the remote object request, not the consistency zone from which the remote object request was sent.

Step 214, the object is obtained based, at least in part, on the portion of the events.

For example, if the object is a derived object, the portion of the events may be used to generate a derived object instance. The derived object instance may be generated by performing the computation specified by a computation specification of the derived object through the portion of the events. In other words, not for all of the events that occurred in the consistency zone. Consequently, the derived object instance may reflect a state of the data in the consistency zone at the time associated with the event specified by the remote object request. By doing so, the derived object instance may be made consistent with the requesting consistency zone. Thus, when the request of Step 210 is received at different points in time, the generated derived object instance is the same. The derived object instance may be used as the object in the case of a derived object.

In another example, if the object is a primary object, the portion of the vents may be used to track changes to the contents of the primary object over the portion of the events. The content of the primary object at the last event of the portion of the events may be used as the object.

In Step 216, the obtained object is provided in response to the request.

The object may be provided in response to the request by sending the object in a message to a requesting entity.

The method may end following Step 216.

To further clarify embodiments of the invention, a non-limiting example is provided in FIGS. 3.1-3.2. Each of these figures may illustrate a system similar to that illustrated in FIG. 1.1 at different points in time. For the sake of brevity, only a limited number of components of the system of FIG. 1.1 are shown in FIGS.

Example

Consider a scenario as illustrated in FIG. 3.1 in which a first consistency zone (300) and a second consistency zone (310) are providing services to clients. At the point in time illustrated in FIG. 3.1, the first consistency zone (300) includes a first primary object (302), a second primary object (304), a derived object (306), an event map (308).

The first primary object (302) reflects the number of incidences of accidents in a workplace and the second primary object (304) reflects the number of reported safety, violations. The derived object (306) specifies that a computation is to be performed by adding the first primary object to the second primary object to calculate a total number of incidences and violations.

The event map (308) specifies that three events have occurred. In the first event, the content of the first primary object was set to the numerical value of two to indicate that two accidents occurred during a first week. In the second event, the content of the second primary object was set to the numerical value of five to indicate that five safety violations were reported during the first week. In the third event, the content of the first primary object was set to zero to indicate that no accidents occurred during the second week.

For modeling purposes, the second consistency zone (310) includes two derived objects that references data of the first consistency zone (300). The first derived object (312) calculates an addition of the derived object (306) at the state of the second event added to the second primary object (304) at the state of the first event. At this point in time, the result of that calculation is 7 ([2+5]+N/A).

The second derived object (314) calculates an addition of the first primary object (302) at the state of the third event added to the second primary object (304) at the first state. At this point in time, the result of that calculation is 0 (0+N/A).

After modeling results using the first derived object (312) and the second derived object (314) turned out poorly, a third derived object (316) as shown in FIG. 3.2 was added to replace the second derived object.

The third derived object (316) calculates an addition of the derived object (306) at the state of the second event added to the second primary object (304) at the third event. At this point in time, the result of that calculation is 12 ([2+5]+5).

After the adequate modeling result from the third derived object (316), time passed to a third point in time resulting in a new event being added to the event map (308) as shown in FIG. 3.3. As seen from the event map (308), a fourth event has been added where the content of the second primary object (304) is set to a numerical value of 2.

After the third point in time, modeling is resumed which required access to the third derived object (316). However, even though the value of the second primary object (304) was set to 2, the content of the third derived object (316) did not change because its content is derived with respect to events that occurred before the fourth even. Thus, the content is still 12.

End of Example

Any of the components of FIG. 1.1 may be implemented as distributed computing devices. A distributed computing device may refer to functionality provided by a logical device that utilizes the computing resources of one or more separate and/or distinct computing devices. As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments of the invention may provide an improved method for performing computations in a distributed environment, Specifically, embodiments of the invention may provide a method of segregating data within a distributed environment into different consistency zones. Each of the consistency zones may be time independent from the other consistency zones. Consequently, the computational cost for performing computations may be reduced because data of the distributed system may only be impacted by a subset of all of the events that have occurred.

Further embodiments of the invention may provide for the performance of computations across time independent consistency zones. Specifically, embodiments of the invention may provide methods for making results of other consistency zones that would otherwise be inconsistent with a consistency zone to be consistent. That is, results of requests to the other consistency zones for the same computation performed at different points in time may return the same result. In contrast, contemporary systems for processing data with time independent zones may be unable to ensure consistent results of computations between zones.

Thus, embodiments of the invention may address problems arising in the field the distributed computations that impact both the efficiency of performing such computations. These problems arise due to the nature of the technological environment of distributed systems that include data zones that are time independent from other data zones.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data management system, comprising:
   a first consistency zone;
   a second consistency zone; and
   a repository manager programmed to:
      identify a calculation event for a derived object of the second consistency zone, wherein the derived object comprises a cross-zone reference to the first consistency zone;
      in response to identifying the calculation event:
         identify an object in the first consistency zone associated with the cross-zone reference;
         send a remote object request, to the first consistency zone, for the object with reference to an event of the first consistency zone specified by the cross-zone reference;
         obtain the object after sending the remote object request;
         obtain a derived object instance based, at least in part, on a computation specification of the derived object and the object;
         obtain a second remote object request, from the first consistency zone, for a second derived object of the second consistency zone; and
         in response to obtaining the second remote object request:
            identify a portion of events in an event map of the second consistency zone implicated by an event specified by the second remote object request;
            obtain a second object based on the portion of events; and
            provide the obtained second object in response to the second remote object request.

2. The data management system of claim 1, wherein obtaining the second object based on the portion of the events comprises:
   generating a second derived object instance based on the portion of events as the second object,
   wherein the derived object does not reflect any other event of the events other than the portion of the events.

3. The data management system of claim 1, wherein the repository manager is part of the second consistency zone.

4. The data management system of claim 1, wherein the repository manager does not manage the first consistency zone.

5. The data management system of claim 1, wherein the event is associated with a past state of the first consistency zone.

6. A method for processing data in a data management system comprising a first consistency zone and a second consistency zone, comprising:
   identifying a calculation event for a derived object of the second consistency zone, wherein the derived object comprises a cross-zone reference to the first consistency zone;
   in response to identifying the calculation event:
      identifying an object in the first consistency zone associated with the cross-zone reference;
      sending a remote object request, to the first consistency zone, for the object with reference to an event of the first consistency zone specified by the cross-zone reference;
      obtaining the object after sending the remote object request;
      obtaining a derived object instance based, at least in part, on a computation specification of the derived object and the object;
      obtaining a second remote object request, from the first consistency zone, for a second derived object of the second consistency zone; and
      in response to obtaining the second remote object request:
         identifying a portion of events in an event map of the second consistency zone implicated by an event specified by the second remote object request;
         obtaining a second object based on the portion of events; and
         providing the obtained second object in response to the second remote object request.

7. The method of claim 6, wherein obtaining the second object based on the portion of the events comprises:
   generating a second derived object instance based on the portion of events as the second object,
   wherein the derived object does not reflect any other event of the events other than the portion of the events.

8. The method of claim 6, wherein the method is performed by a repository manager that is part of the second consistency zone.

9. The method of claim 6, wherein the method is performed by a repository manager that does not manage the first consistency zone.

10. The method of claim 6, wherein the event is associated with a past state of the first consistency zone.

11. A non-transitory computer readable medium comprising computer readable program code, which when executed by a computer processor enables the computer processor to perform a method for processing data in a data management system comprising a first consistency zone and a second consistency zone, the method comprising:
    identifying a calculation event for a derived object of the second consistency zone, wherein the derived object comprises a cross-zone reference to the first consistency zone;
    in response to identifying the calculation event:
       identifying an object in the first consistency zone associated with the cross-zone reference;
       sending a remote object request, to the first consistency zone, for the object with reference to an event of the first consistency zone specified by the cross-zone reference;
       obtaining the object after sending the remote object request;
       obtaining a derived object instance based, at least in part, on a computation specification of the derived object and the object;

obtaining a second remote object request, from the first consistency zone, for a second derived object of the second consistency zone; and in response to obtaining the second remote object request:

identifying a portion of events in an event map of the second consistency zone implicated by an event specified by the second remote object request;

obtaining a second object based on the portion of events; and providing the obtained second object in response to the second remote object request.

12. The non-transitory computer readable medium of claim 11, wherein obtaining the second object based on the portion of the events comprises:

generating a second derived object instance based on the portion of events as the second object, wherein the derived object does not reflect any other event of the events other than the portion of the events.

13. The non-transitory computer readable medium of claim 11, wherein the method is performed by a repository manager that is part of the second consistency zone.

14. The non-transitory computer readable medium of claim 11, wherein the method is performed by a repository manager that does not manage the first consistency zone.

* * * * *